Nov. 22, 1938.  W. I. JONES  2,137,532
GRILLE FASTENER AND INSTALLATION OF THE SAME
Filed Feb. 24, 1936
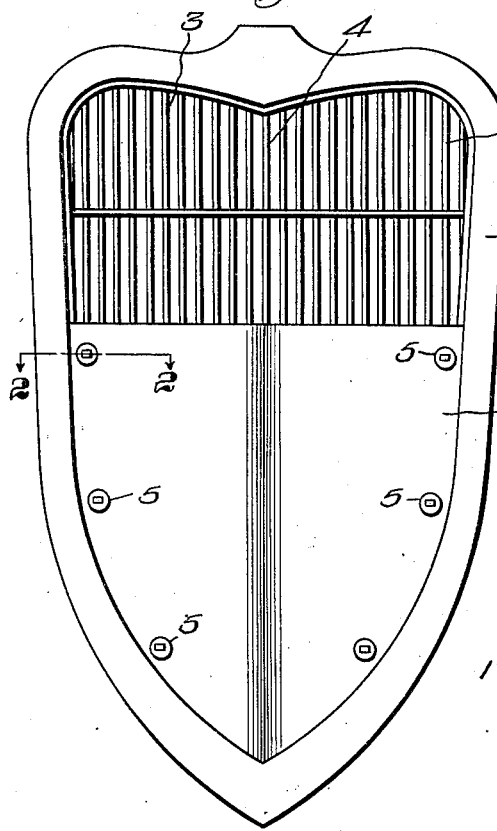
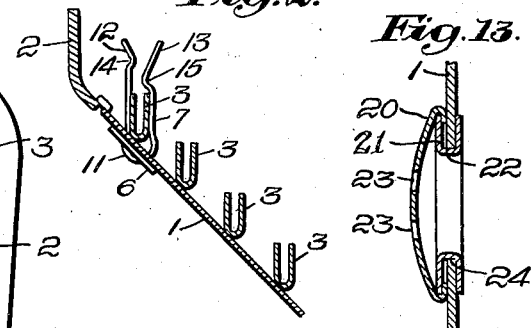
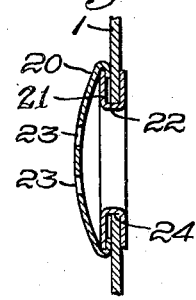
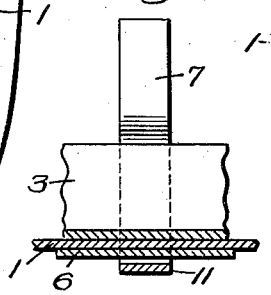
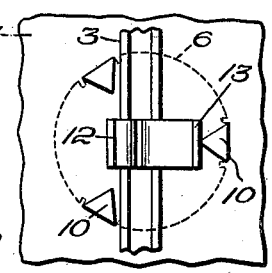
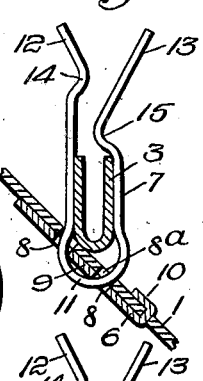
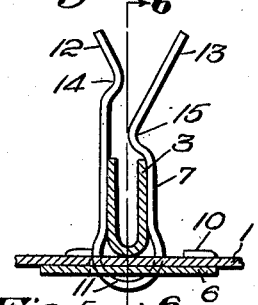
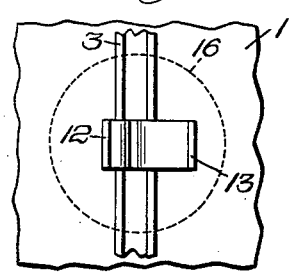
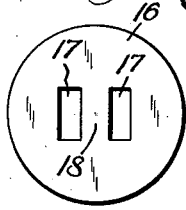
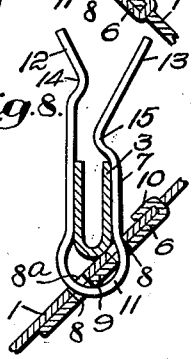
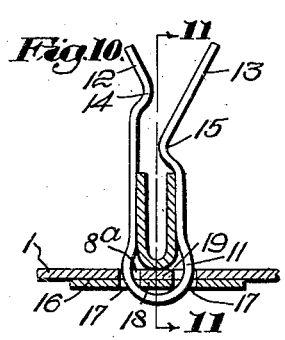
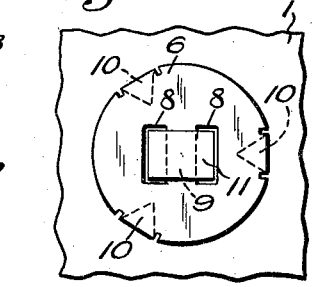
Inventor:
Walter I. Jones Patented Nov. 22, 1938

2,137,532

UNITED STATES PATENT OFFICE 2,137,532

GRILLE FASTENER AND INSTALLATION OF THE SAME

Walter I. Jones, Arlington, Mass., assignor to United-Carr Fastener Corporation, Cambridge, Mass., a corporation of Massachusetts Application February 24, 1936, Serial No. 65,257

5 Claims. (Cl. 24—259)

My invention relates to improvements in the fastening means used to secure a cover to an automobile radiator grille and to installations of the same.

In the drawing, which illustrates preferred forms of my invention:—

Fig. 1 is a front view of a complete installation including my novel fastener;

Fig. 2 is an enlarged section taken on the line 2—2 of Fig. 1;

Fig. 3 is an enlarged rear view of a fragment of the installation shown in Fig. 1 including my improved fastener unit, a support and the adjacent part of the cover;

Fig. 4 is a sectional view of the installation shown in Fig. 3 with the covering attached to a flat grille;

Fig. 5 is a front view of the installation shown in Fig. 3;

Fig. 6 is a section taken on the line 6—6 of Fig. 4;

Fig. 7 is a view similar to that shown in Fig. 4, but with the covering attached to an angled or rounded grille;

Fig. 8 is a view similar to that of Fig. 7 showing how the fastener member of my improved fastening unit may be swiveled for attaching the cover to a grille presenting a different angle or curve;

Fig. 9 is a view similar to Fig. 3 showing a modified form of attaching part for assembling the fastener member with the cover;

Fig. 10 is a sectional view of the installation shown in Fig. 9;

Fig. 11 is a section taken on the line 11—11 of Fig. 10;

Fig. 12 is a plan view of the modified attaching part shown in Figs. 9–11; and

Fig. 13 is a sectional view showing a third form of attaching part for assembling the fastener member with the cover.

The object of my invention is to provide an efficient and inexpensive fastening means for securing a flexible cover to an automobile grille. Several of the grilles now in common use are constructed in an angular or rounded shape with the grille bars disposed symmetrically on each side of the grille center in stepped-up relation one to another. Furthermore, in most cases, the bars on each side of the grille center are in substantially parallel relationship with each other so that if the longitudinal planes of the respective side bars were extended to meet the projected longitudinal plane of the grille center bar, they would intersect the projected center plane in a way to form equal angles therewith, and the planes of respective bars on each side of the center bar would intersect the center bar plane at a common point.

Several types of fasteners used for attaching a flexible cover to a flat grille are attached to the cover so as to present bar-engaging means capable of extending from the cover only in perpendicular relation thereto. These fasteners are obviously of no use for securing a cover to a grille having bars disposed at an angle in the manner described above. The fastener of this present application is particularly, though not exclusively, adapted for securing a flexible cover to a grille of the class described, as the bar-engaging member, forming a part of the fastener unit, is so constructed that it may be turned freely to positions of varied angular relationship to the cover in the manner which I have set out below.

Referring now to the accompanying drawing, I have shown in Fig. 1 a flexible cover 1 which is cut in a shape to cover a desired part of a V-shaped grille 2. The grille 2 is made up of the grille bars 3 disposed on each side of a central grille bar 4 in substantially parallel relationship to each other, as most clearly shown in Fig. 2. The cover 1 is secured to the grille by a plurality of fastener units 5 assembled with the cover in a manner which will be hereinafter more fully described and having attaching members engaging the grille bars 3, as shown in Figs. 2–11.

Referring to the fastener unit per se, my preferred form, as best illustrated in Figs. 2–8, comprises two parts, an attaching part 6 for assembling the unit with the cover 1, and an attaching member 7 for engaging a grille bar to secure the cover to the grille. The part 6, in my preferred form, is constructed in the form of a substantially flat plate having a pair of transverse apertures 8 therein (Fig. 5) identical in form to the apertures 17 of the modified attaching plate shown in Fig. 12. A bar 9 separates the apertures 8. Integral with the outside edges of my preferred form, I have provided prongs 10 (Figs. 3–5) extending from the plate and adapted to be bent into clenched engagement with the cover 1 (Fig. 4).

The attaching member 7 is of substantially U-shaped formation, shown in Figs. 4, 7 and 8, and constructed by bending a strip of flat spring metal so as to provide a loop 11 at one end with the sides of the loop continuing outwardly to provide yieldable arms 12 and 13 at the other end. At a point adjacent to the free end of the arm 12, in my preferred form of fastening member, I have formed the angle shoulder 14, and on the arm 13 I have formed a similarly shaped shoulder 15. It will be noticed that the shoulders 14 and 15 are not located on their respective arms at equal distances from the loop 11, but instead are placed so that one of the shoulders is nearer to the loop than the other. This construction is important in that it enables the fastener member to be engaged with grille bars of varied thicknesses. The arms adjacent to the side of the shoulders away from the head portion are extended away from each other to provide a diverging surface for engagement with the grille bar.

In assembling the parts of the installation, I first secure the attaching plate 6 with the cover 1. This act is carried out by inserting the prongs 10 of the plate through the material of the cover at proper points to permit the apertures 8 of the plate to align with similarly shaped apertures 8a formed in the cover. The prongs 10 are then bent over to clench the material between the prongs and the attaching plate (Fig. 4) thereby permanently securing the parts together.

To assemble the attaching member 7 with the part 6 the free ends of the arms 12 and 13 are inserted into the transverse apertures of the part and the underlying apertures 8a of the cover 1. A slight pressure is exerted upon the loop end 11 of the member causing the arms to be forced apart by the action of the bar 9 on the shoulders 14 and 15 until the shoulders have passed by the bar 9, at which time the arms will spring together again as a result of the natural resiliency therein. The member 7 is now securely assembled with the attaching plate 6 in such a way that the loop 11, which is preferably slightly bulged, as shown in Fig. 4, is in swivel engagement with the bar 9 and capable of a free swinging movement, as best illustrated in Figs. 7 and 8.

To engage my preferred form of fastener with a bar of the flat grille, as shown in Fig. 4, the V-shaped divergence of the fastener arms is pushed against the proper bar with the result that the arms will be forced apart until the bar has passed the shoulder by which it is to be held in place, at which time the arms will contract again. The arms of the fastener members extend from the cover 1 in substantially right-angular relation, when engaged with the bars of a flat grille, so that no swivel movement of the members relative to the attaching part is necessary. In engaging the fastener member with the bars of an angled or curved grille, the loop portion 11 of each member is swiveled or pivoted about the bar 9 until the arms 12 and 13 are positioned at the desired angle relative to the cover 1 whereupon the arms may be pushed into fastening engagement with the proper grille bars, in the manner described, in connection with the bars of a flat grille. The flexible cover 1 is easily bent to conform with the angle or curve of the grille and when the fastener members are in final engagement with the bar members the cover will lie flat against the bar ends, as most clearly shown in Fig. 2.

In Figs. 9-11 I have illustrated an installation which is similar to that shown in Figs. 1-8 except for the fact that the fastener member 7 is assembled with an attaching part 16 of slightly modified construction as compared with the attaching part 6 of my preferred form. The plate 16 is provided with transverse apertures 17 which are identical in shape, for all ordinary uses of the plate, with the apertures 8 of the plate 6, but the attaching prongs have been omitted in my modified construction. A bar 18 separates the apertures 17. Although I prefer to form the plate 16 of metal material, it is understood that other materials are capable of satisfactory operation for many uses of the fastener.

In assembling my modified form of fastener unit with the other parts of the installation, I first secure the fastener member 7 with the attaching plate 16 by entering the free ends of the fastener into the apertures in the plate 16 and then pressing the fastener into position. The apertured cover 1 is then moved up to the grille and held in desired position relative to the same while the yieldable arms 12 and 13 of the respective fastener members are engaged with the proper grille bars. As a result of this action, the bar 9 of the attaching plate 16 and the portion 19 between the apertures of the cover 1 will be securely held between portions of the loop 9 and the outer end of the grille bar, as most clearly shown in Fig. 10, thereby maintaining the cover and the attaching plate 16 in firm assembly with each other.

In Fig. 13 I have shown a third form of attaching part comprising a cap 20, preferably having inturned flanges, gripping the base 21 of an eyelet member 22. The outer surface of the cap is provided with apertures 23, similar in shape to the apertures 8 and 17 of the respective attaching plates 6 and 16, for receiving the arms 12 and 13 of the fastener member 7. To assemble my third form of attaching part with the cover 1 the eyelet 22 is first inserted through an aperture 24 of the cover and its free end is then upset to clench the material of the cover between the upset portion of the eyelet and the cap. I do not wish, however, to limit myself to an attaching part exactly as illustrated and described, because it is obvious that the cap and eyelet parts could be made of one-piece construction thereby providing an efficient attaching part without departing from the scope and spirit of the invention. After the part is secured with the covering the arms 12 and 13 of the fastener member 7 are inserted through the apertures 23 of the cap for engagement with a grille bar exactly as described in connection with the first form of my invention.

Although I have illustrated and described preferred embodiments of my invention, I do not wish to be limited thereby, because the scope and spirit of my invention is best defined by the following claims.

I claim:

1. A fastener unit comprising a relatively flat metal plate having prongs integral therewith for attachment with an apertured support of flexible material, said plate having a pair of transverse apertures therein, a bar separating said apertures, and a fastener member assembled with said plate, said member having a loop portion at one end in swivel engagement with said bar and a pair of yieldable arms extending from said loop for receiving a part between them to which the member is to be attached, at least one of said arms having an outwardly disposed shoulder located on its length.

2. A fastener unit comprising a cap-shaped member having an eyelet associated therewith for attaching said cap to an apertured support, said cap member having a pair of apertures in one face thereof, and a fastener member assembled with said cap-shaped member, said member having a loop portion at one end in swivel engagement with the material of said part between said apertures and a pair of yieldable arms at the other end for receiving a part between them to which the fastener is to be attached.

3. A snap fastener unit for radiator grille covers comprising a one-piece part having a pair of spaced apertures therein and a snap fastener member assembled with said part, said snap fastener member having a loop portion at one end in swivel engagement with the material of said part between said apertures, and said loop portion being substantially circular and of no greater diameter than the distance between the outside edges of said apertures, a pair of yieldable arms of substantial length extending from said loop portion for receiving a grille bar between them and a relatively abrupt shoulder on at least one of said arms in substantial spaced relation from said loop portion, and the free ends of said yieldable arms being substantially spaced from said apertured part.

4. A snap fastener unit for radiator grille covers comprising, in combination, a one-piece relatively rigid washer-like part apertured to permit the passage of a snap fastener member, a snap fastener member associated therewith and having a generally circular-shaped loop at one end for swivel engagement with said washer-like part, a pair of yieldable arms extending from said loop through the apertured part, the ends of said yieldable arms being substantially spaced from said apertured part and shaped to provide a V portion and at least one of said arms having a relatively abrupt shoulder located between the bottom of said V portion and said loop portion.

5. A snap fastener unit for radiator grille covers comprising a one-piece part having a pair of spaced apertures therein and a snap fastener member assembled with said part, said snap fastener member having a loop portion at one end in swivel engagement with the material of said part between said apertures, and said loop portion being substantially circular and of no greater diameter than the distance between the outside edges of said apertures, a pair of yieldable arms of substantial length extending from said loop portion for receiving a grille bar between them and a relatively abrupt shoulder on at least one of said arms in substantial spaced relation from said loop portion, and the greatest diameter of said loop portion being greater than the distance between said arms adjacent said loop.

WALTER I. JONES.